(12) United States Patent
Giresi et al.

(10) Patent No.: US 11,068,496 B2
(45) Date of Patent: Jul. 20, 2021

(54) SYSTEM AND METHOD FOR DATA MANAGEMENT

(71) Applicant: JPMorgan Chase Bank, N.A., New York, NY (US)

(72) Inventors: Anthony Giresi, Staten Island, NY (US); Mark Atkinson, Glasgow (GB); Praveen Komarraju, North Brunswick, NJ (US); Rutherford L. Le Blang, Wayne, NJ (US); Yingjie Li, Brooklyn, NY (US); Niall Maclean, Glasgow (GB); Somsuvra Sarkar, Glasgow (GB); Stephen Sloss, Newton Mearns (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 753 days.

(21) Appl. No.: 15/788,913

(22) Filed: Oct. 20, 2017

(65) Prior Publication Data

US 2019/0121898 A1    Apr. 25, 2019

(51) Int. Cl.
*G06F 16/00* (2019.01)
*G06F 16/25* (2019.01)
*G06F 16/2455* (2019.01)

(52) U.S. Cl.
CPC ........ *G06F 16/254* (2019.01); *G06F 16/2455* (2019.01); *G06F 2216/03* (2013.01)

(58) Field of Classification Search
CPC combination set(s) only.
See application file for complete search history.

(56) References Cited

U.S. PATENT DOCUMENTS

| | | | |
|---|---|---|---|
| 2008/0049614 A1* | 2/2008 | Briscoe | H04L 41/0806 370/230 |
| 2008/0129452 A1 | 6/2008 | Agrawal et al. | |
| 2008/0133594 A1 | 6/2008 | Fotinatos et al. | |
| 2011/0161478 A1* | 6/2011 | Formo | H04L 67/306 709/223 |
| 2011/0246530 A1* | 10/2011 | Malafsky | G06N 5/022 707/794 |
| 2013/0097664 A1 | 4/2013 | Herz et al. | |
| 2013/0124574 A1* | 5/2013 | Brettin | G06F 16/9024 707/798 |

(Continued)

FOREIGN PATENT DOCUMENTS

WO    WO 2016/138067    9/2016

OTHER PUBLICATIONS

PCT International Search Report and Written Opinion, International Searching Authority, International Application No. PCT/US2018/056894, dated Jan. 15, 2019, pp. 1-8.

*Primary Examiner* — Yicun Wu
(74) *Attorney, Agent, or Firm* — Greenberg Traurig LLP

(57) ABSTRACT

Systems and methods for data management are disclosed. In one embodiment, in an information processing apparatus comprising at least one computer processor, a method for data management may include (1) generating a unified model for a plurality of data sources for an organization, the unified model identifying the data sources and a type of data associated with each data source; (2) harvesting data from the data sources; (3) linking the harvested data to the unified model; and (4) receiving and processing a data lineage query against the linked harvested data.

18 Claims, 2 Drawing Sheets

(56) References Cited

U.S. PATENT DOCUMENTS

| | | | |
|---|---|---|---|
| 2014/0297713 A1* | 10/2014 | Meigen | G06F 8/20 |
| | | | 709/203 |
| 2014/0324393 A1* | 10/2014 | Alfassi | G06F 30/20 |
| | | | 703/1 |
| 2016/0092604 A1* | 3/2016 | Jang | H02H 1/0061 |
| | | | 703/1 |

* cited by examiner

SYSTEM AND METHOD FOR DATA MANAGEMENT

BACKGROUND OF THE INVENTION

1. Field of the Invention

The present disclosure generally relates to systems and methods for data management, including data lineage, data usage, and data analysis.

2. Description Of The Related Art

Data may be used within an organization in many ways. For example, data may be received by one part of an organization, stored in a shared database, and then used by other parts of the organization.

SUMMARY OF THE INVENTION

Systems and methods for data management are disclosed. In one embodiment, in an information processing apparatus comprising at least one computer processor, a method for data management may include (1) generating a unified model for a plurality of data sources for an organization, the unified model identifying the data sources and a type of data associated with each data source; (2) harvesting data from the data sources; (3) linking the harvested data to the unified model; and (4) receiving and processing a data lineage query against the linked harvested data.

In one embodiment, the unified model may further identify an application and the type of data that the application accesses.

In one embodiment, the unified model may further identify a user and the type of data that the user accesses.

In one embodiment, the unified model may include an association for a data element to a logical data model attribute.

In one embodiment, the data source may comprise an application.

In one embodiment, the data may be harvested in a first format, first format comprising one of XML, JSON, SharePoint, and Spreadsheet formats. In one embodiment, the harvested data may be translated from the first format into a second format. In one embodiment, the second format may be a Research Description Framework format.

In one embodiment, the linked harvested data may be stored in a graph database.

In one embodiment, the data lineage query may be a traceability query.

In one embodiment, the computer processor may execute an action in response to the query. The action may be a quarantining action, a disconnect action, etc.

In one embodiment, the method may further include registering the plurality of data sources by recording metadata from the plurality of data sources and conforming the metadata to the unified model.

In one embodiment, the unified data may define a type of data and a meaning of that data to the organization.

In one embodiment, the query may return an identification of at least one data source that had access to the data, an identification of at least one application that had access to the data, an identification of at least one user that had access to the data, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein relate to data management architectures.

Embodiments provide the integration and reporting on metadata within an organization, including the organization's domains (e.g., lines of business, departments, technologies, etc.). In one embodiment, graph databases and semantic search technologies may be used to enable the incorporation of a wide array of data sources as well as flexible, intuitive user interfaces.

In embodiments, data within an organization may be linked to create a single unified view of an organization's domains, which may be used to support data-driven decision making. Embodiments may assist in understanding the root cause of data quality issues, in understanding how technology processes and stores the data used by the organization to improve the cost effectiveness of the organization's technical solutions, in understanding how technology processes and stores the data used by the organization to minimize the organization's exposure to financial or reputational loss as a result of a loss of data or breach of data confidentiality, etc.

For example, embodiments may provide answers to some or all of the following: (1) what organizational applications, user tools, etc., feed certain reports; (2) what organization applications subscribe to other applications; (3) where does certain data get used; (4) where are critical data elements stored physically across the organization; (5) what is the data quality of the physical instances (e.g., in Systems of Record (SOR)) of critical data elements; (6) are the applications that are SORs for my critical data elements compliant with organizational data management standards; (7) are any report cells being sourced from a decommissioned system; (8) are there report cells that share a Micro Data Reference Manual (MDRM) Identifier sourced from the same fields/systems/domains; (9) for report cells linked to critical data elements, are source systems listed as Authoritative Data Sources (ADS) or SORs; (10) what Data Quality (DQ) issues are related to the specific reports/schedules/systems required for a financial firm's regulatory compliance; etc.

Figure 1:
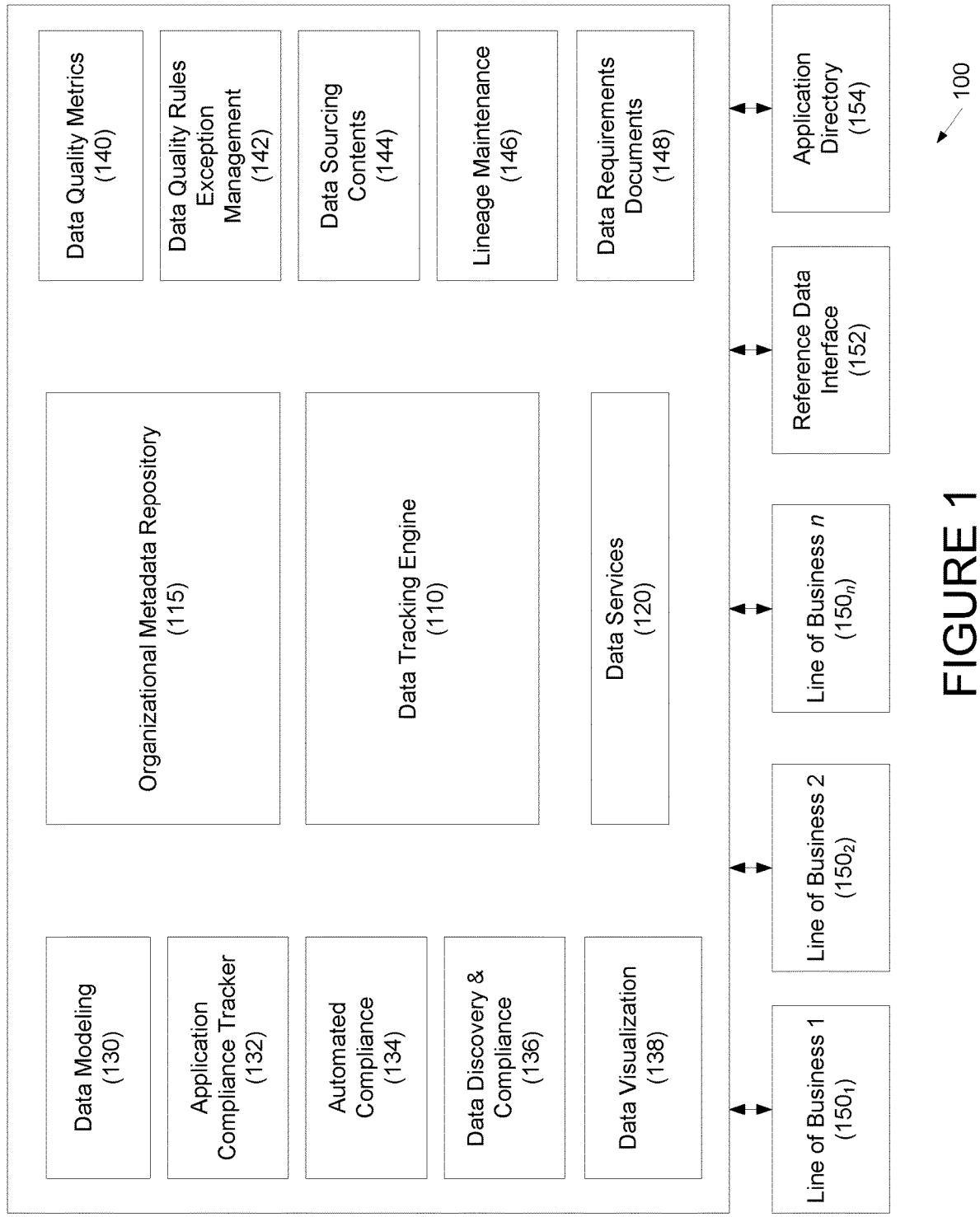
FIG. 1 depicts an architectural diagram of a system for data management according to one embodiment.

Referring to FIG. 1, an architectural diagram of a system for data management is disclosed according to one embodiment. System 100 may include data tracking engine 110, which may track the use of data by an organization. Data tracking engine 110 may be executed by a server, in the cloud, etc.

In one embodiment, data tracking engine 110 may be an organization-wide meta-data repository that is able to resolve the organization's business problems such as data lineage, data traceability, data usage, etc. In one embodiment, it may include a knowledge graph, a knowledge entity worker, a knowledge generator worker, and a knowledge query worker. A knowledge graph may be a knowledge base used by the data tracking engine to model and manage the firm meta-data and data in a semantic seamless way. A knowledge entity worker may be responsible for managing knowledge graphs defined in a knowledge base. A knowledge generator worker may produce new knowledge by using existing content in a knowledge graph. A knowledge query worker may be used to inquire the knowledge base content by using query services.

Data tracking engine 110 may receive metadata from organizational metadata repository 115, which may include a glossary of critical data elements, a Logical Data Model (LDM), a message schema, etc. In one embodiment, these elements may be defined by the organization. In another embodiment, machine learning may be used to update the glossary and models as is necessary and/or desired. For example, a "Country" message filed "country Id" may be traced to a LDM that defines a "Country" data entity and its each attribute has a lineage to a critical data element (CDE) "Country Code" defined in a business glossary. In this context, a LDM represents the organization's data as it is understood by the business. A business glossary may establish common terminology across different applications and groups within the organization.

In one embodiment, data tracking engine 110 may employ machine learning and/or artificial intelligence to identify potential data exposures.

In one embodiment, data tracking engine 110 may continuously monitor data throughout an organization in real-time.

Data services 120 may provide services, such as data registration, data loading, etc. In one embodiment, data may be registered when first introduced into the organization, and may be loaded from lines of business, external sources, etc. The data registration may record the metadata of incoming reservoir sources data by conforming to a model. This model may define, for example, the type of data that will be received, what meaning the data has to the organization, and what standard the data should follow.

System 100 may further include modules such as data modeling module 130, application compliance tracker module 132, automated compliance module 134, data discovery and compliance module 136, data visualization module 138, data quality metrics module 140, data quality rules exception management module 142, data sourcing contracts module 144, stated lineage maintenance module 146, and data requirements documents module 148.

In one embodiment, data modeling module 130 may model data using, for example, a logical/physical data model.

In one embodiment, application compliance tracker module 132 may manage and track compliance to organizational management requirements.

In one embodiment, automated compliance module 134 may monitor systems development life cycle (SDLC) compliance to, for example, organization data management requirements.

In one embodiment, data discovery and compliance module 136 may identify types of data in data sources and may interpret changes to determine where data may be stored.

In one embodiment, data visualization module 138 may present an interface by which the results of data tracking engine 110 may be presented to the user graphically, textually, or as otherwise necessary and/or desired.

In one embodiment, data quality metrics module 140 may identify data quality issues, such as null or blank value in fields, bad formats for a telephone number, social security numbers, etc. In one embodiment, it may manage issues with data.

In one embodiment, data quality rules exception management module 142 may provide data discovery and profiling, data quality rules, data quality result analytics, linkage to data quality issues, etc.

In one embodiment, data sourcing contracts module 144 may provide governance of data flows between different applications. It may conform to data sourcing principles.

In one embodiment, stated lineage maintenance module 146 may capture the lineage of data from non-technical harvesting, such as interviews, with business owners and report and data warehouse developers.

In one embodiment, data requirements documents module 148 may provide organization-specific application data requirements. In one embodiments, these requirements may be specified via a user interface (not shown).

Lines of business $150_1 \ldots 150_n$ may be subunits within an organization. In one embodiment, the relationship between one or more of lines of business $150_1 \ldots 150_n$ may be based on an organizational chart, etc.

Reference data interface 152 may retrieve reference data from a data source. In one embodiment, reference data may be used for querying data to look for patterns that might show concern (e.g., decommissioned applications providing key financial information to regulatory reports, etc.).

Application directory 154 may maintain a listing of some or all applications within an organization. In one embodiment, application directory 154 may identify which lines of business 150 may use or be responsible for an application.

Figure 2:
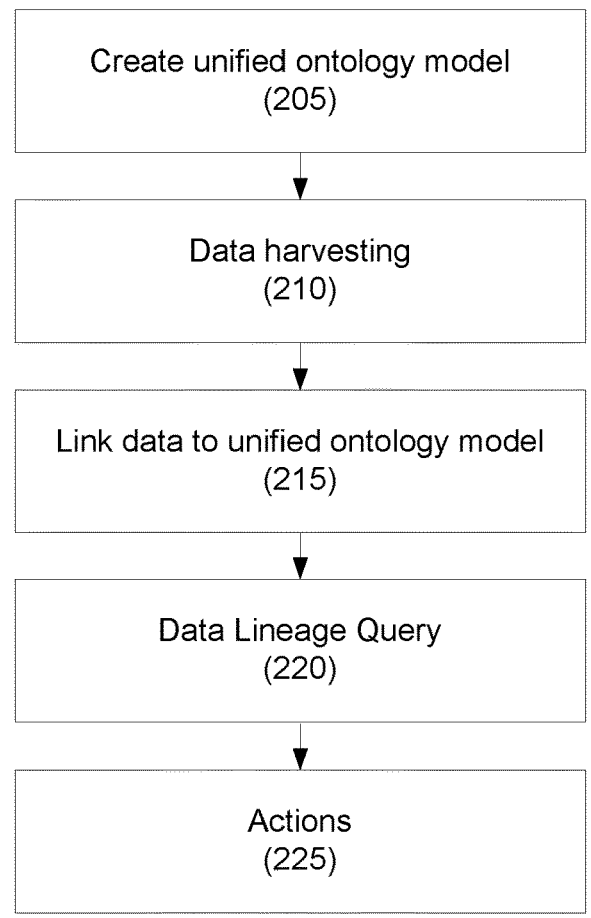
FIG. 2 depicts a method for data management according to one embodiment.

Referring to FIG. 2, a method for data management is disclosed according to one embodiment. In step 205, a unified model may be created for an organization's data. In one embodiment, the unified model may include all lines of business, subunits, etc. for the organization.

In one embodiment, the unified model may provide a holistic data view in a machine-understandable way by defining, for example, the types, properties, and relationships of entities, applications, and data that exist within an organization, subunit(s) of the organization, etc. For example, it may describe the mapping relationship for a critical data element to a logical data model attribute.

In one embodiment, the unified model may be predefined. For example, during application onboarding, a check may be made to determine whether the current unified model has modelled the application domain correspondingly. If it has, a new unified model may not need to be created, updated, etc. Otherwise, the unified model may be extended to define the corresponding application model.

In step 210, the data may be harvested. In one embodiment, this may include collecting data from different sources of information, such as applications, databases, etc. and translating them into Research Description Framework ("RDF") format. The RDF is a family of World Wide Web Consortium (W3C) specifications originally designed as a metadata data model including ontologies. It has come to be used as a general method for conceptual description or modeling of information that is implemented in web resources, using a variety of syntax notations and data serialization formats. For example, the method translates data in formats of XML, JSON, SharePoint, Spreadsheets, etc. into RDF.

In step 215, the harvested data may be linked to the unified model, and may be stored in, for example, a graph database. In one embodiment, SPARQL Protocol and RDF Query Language ("SPARQL") queries, java programs, etc. may be employed to produce RDF knowledge conforming to the unified ontologies. This RDF knowledge contains the RDF triples with business meaning to serve organizational goals.

In step 220, a data lineage query may be run against the data in the graph database. For example, a user may query a certain data type using, for example, a user interface. In response to the query, applications that use or access that data, and the downstream data that is affected by the specified data, may be identified.

In one embodiment data, a traceability and/or lineage analysis of data may be performed. In one embodiment a lineage may illustrate, for example, a flow of how data has moved, is moving, or will move and transform between systems, applications, tables, data domains, etc. A traceability view may be provided to illustrate the impact of the data on the different domains. For example, by issuing a SPARQL query, the lineage starting from a critical data element, to a logical data model attribute, to a reference data interface message field and to an application subscribing this message may be retrieved.

In step 225, one or more action may be taken. For example, if a data breach is identified, an automated inventory of the breach (application, server, database, user(s), etc.) may be performed to determine what type of information (Personal Information (PI) or Intellectual Property (IP)) has been put at risk, allowing one or more protective actions to be taken, such as disconnecting a server; disconnecting a database; blacklisting an application; alerting the affected owners, systems, etc.; flagging data, applications, databases, etc.; quarantining data, applications, databases, etc.; generating reports, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a cardholder or cardholders of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "cardholder interfaces" may be utilized to allow a cardholder to interface with the processing machine or machines that are used to implement the invention. As used herein, a cardholder interface includes any hardware, software, or combination of hardware and software used by the processing machine that allows a cardholder to interact with the processing machine. A cardholder interface may be in the form of a dialogue screen for example. A cardholder interface may also include any of a mouse, touch screen, keyboard, keypad, voice reader, voice recognizer, dialogue screen, menu box, list, checkbox, toggle switch, a pushbutton or any other device that allows a cardholder to receive information regarding the operation of the processing machine as it processes a set of instructions and/or provides the processing machine with information. Accordingly, the cardholder interface is any device that provides communication between a cardholder and a processing machine. The information provided by the cardholder to the processing machine through the cardholder interface may be in the form of a command, a selection of data, or some other input, for example.

As discussed above, a cardholder interface is utilized by the processing machine that performs a set of instructions such that the processing machine processes data for a cardholder. The cardholder interface is typically used by the processing machine for interacting with a cardholder either to convey information or receive information from the cardholder. However, it should be appreciated that in accordance with some embodiments of the system and method of the invention, it is not necessary that a human cardholder actually interact with a cardholder interface used by the processing machine of the invention. Rather, it is also contemplated that the cardholder interface of the invention might interact, i.e., convey and receive information, with another processing machine, rather than a human cardholder. Accordingly, the other processing machine might be characterized as a cardholder. Further, it is contemplated that a cardholder interface utilized in the system and method of the invention may interact partially with another processing machine or processing machines, while also interacting partially with a human cardholder.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for data management, comprising:
   in an information processing apparatus comprising at least one computer processor:
   generating a unified model for a plurality of data sources for an organization, the unified model identifying the data sources and a type of data associated with each data source;
   harvesting data from the data sources;
   linking the harvested data to the unified model, wherein the linking comprises generating a data lineage including one or more applications that access the harvested data, and downstream data that is associated with the harvested data; and receiving and processing a data lineage query against the linked harvested data.

2. The method of claim 1, wherein the unified model further identifies an application and the type of data that the application accesses.

3. The method of claim 1, wherein the unified model further identifies a user and the type of data that the user accesses.

4. The method of claim 1, wherein the unified model comprises an association for a data element to a logical data model attribute.

5. The method of claim 1, wherein the data source comprises an application.

6. The method of claim 1, wherein the data is harvested in a first format, first format comprising one of XML, JSON, SharePoint, and Spreadsheet formats.

7. The method of claim 6, wherein the harvested data is translated from the first format into a second format.

8. The method of claim 7, wherein the second format comprises a Research Description Framework format.

9. The method of claim 1, wherein the linked harvested data is stored in a graph database.

10. The method of claim 1, wherein the data lineage query is a traceability query.

11. The method of claim 1, further comprising:
the computer processor executing an action in response to the query.

12. The method of claim 11, wherein the action is a quarantining action.

13. The method of claim 11, wherein the action is a disconnect action.

14. The method of claim 1, further comprising:
registering the plurality of data sources by recording metadata from the plurality of data sources and conforming the metadata to the unified model.

15. The method of claim 1, wherein the unified data defines a type of data and a meaning of that data to the organization.

16. The method of claim 1, wherein the query returns an identification of at least one data source that had access to the data.

17. The method of claim 1, wherein the query returns an identification of at least one application that had access to the data.

18. The method of claim 1, wherein the query returns an identification of at least one user that had access to the data.

* * * * *